United States Patent

Stevenson et al.

[11] Patent Number: 5,934,006
[45] Date of Patent: Aug. 10, 1999

[54] ANESTHETIC FISHING LURE

[76] Inventors: Frank A. Stevenson; Sandra M. Stevenson, both of 11520 Water Willow Ave., Bradenton, Fla. 34202-1873

[21] Appl. No.: 09/026,717

[22] Filed: Feb. 20, 1998

[51] Int. Cl.⁶ .................................................... A01K 85/00
[52] U.S. Cl. .......................................... 43/42.06; 43/43.16
[58] Field of Search ................................ 43/42.24, 42.06, 43/42.25, 42.53, 42.02, 42.26, 42.14, 42.17, 43.6, 42.15, 43.16

[56] References Cited

U.S. PATENT DOCUMENTS

| | | | |
|---|---|---|---|
| 2,328,295 | 7/1943 | Provost | 43/42.15 |
| 3,349,513 | 10/1967 | Jeff | 43/42.02 |
| 3,964,203 | 6/1976 | Williams, Jr. | 43/42.02 |
| 4,543,742 | 10/1985 | Rand, Jr. | 43/43.16 |
| 4,953,319 | 9/1990 | Kasper et al. | 43/42.06 |
| 5,068,993 | 12/1991 | Millar | 43/4.5 |
| 5,119,583 | 6/1992 | Mason | 43/42.53 |
| 5,121,567 | 6/1992 | Boone | 43/42.24 |
| 5,333,405 | 8/1994 | Bowles | 43/42.06 |
| 5,465,523 | 11/1995 | Garst | 43/42.24 |
| 5,517,781 | 5/1996 | Paoletta, Jr. | 43/42.06 |
| 5,625,975 | 5/1997 | Imes | 43/42.09 |
| 5,689,910 | 11/1997 | Kato | 43/42.24 |

*Primary Examiner*—Michael J. Carone
*Assistant Examiner*—Judith A. Nelson
*Attorney, Agent, or Firm*—Kenneth L Tolar

[57] ABSTRACT

The present invention relates to a fishing lure resembling a worm having a unique motion that attracts or aggravates a fish when pulled through water. A first embodiment includes an elongated head portion, a spiraled body portion and a plurality of tail members extending therefrom. When dynamic, the spiraled body portion intervally extends and recoils in a spring like fashion. Second and third embodiments include a jagged and sinuous body portion, respectively, with a plurality of tail members extending therefrom. The jagged lure is designed to simulate a worm while the sinuous version, when dynamic, reciprocates between a substantially linear position and its original position. A fourth embodiment has a substantially linear, elongated body portion with a plurality of branches obliquely extending from opposing sides thereof. Each embodiment has a cap member removably attached to the shanked portion of a hook with an anesthetic solution received therein for deadening a fish's mouth when it engages the hook.

8 Claims, 1 Drawing Sheet

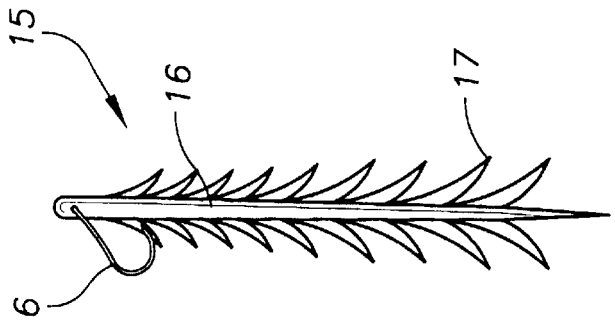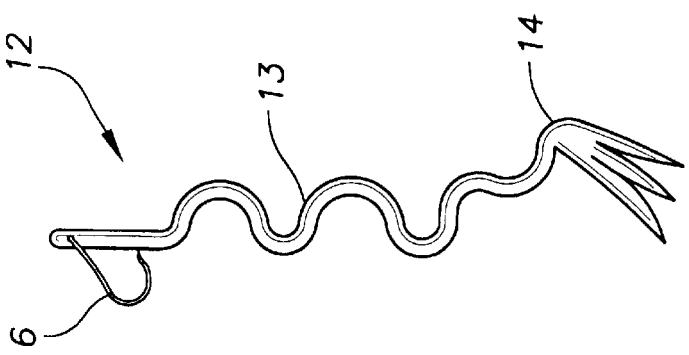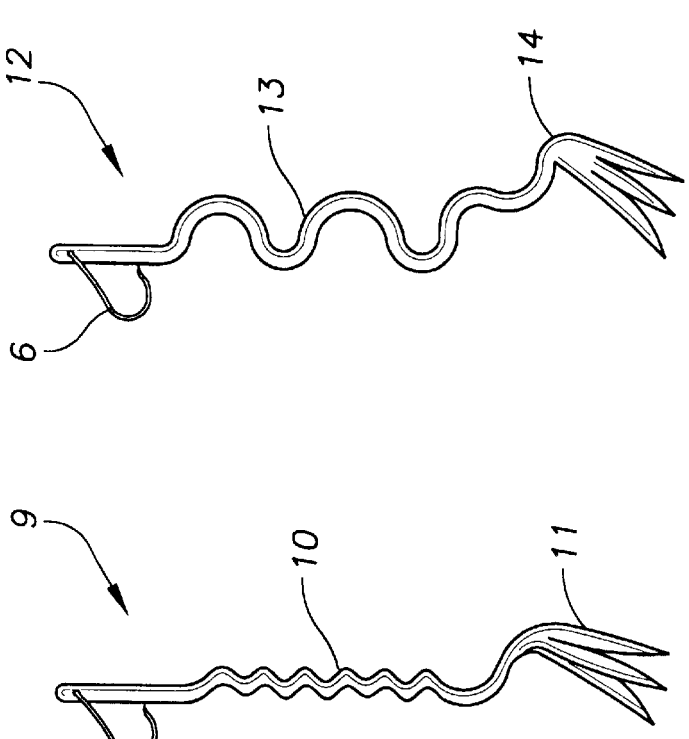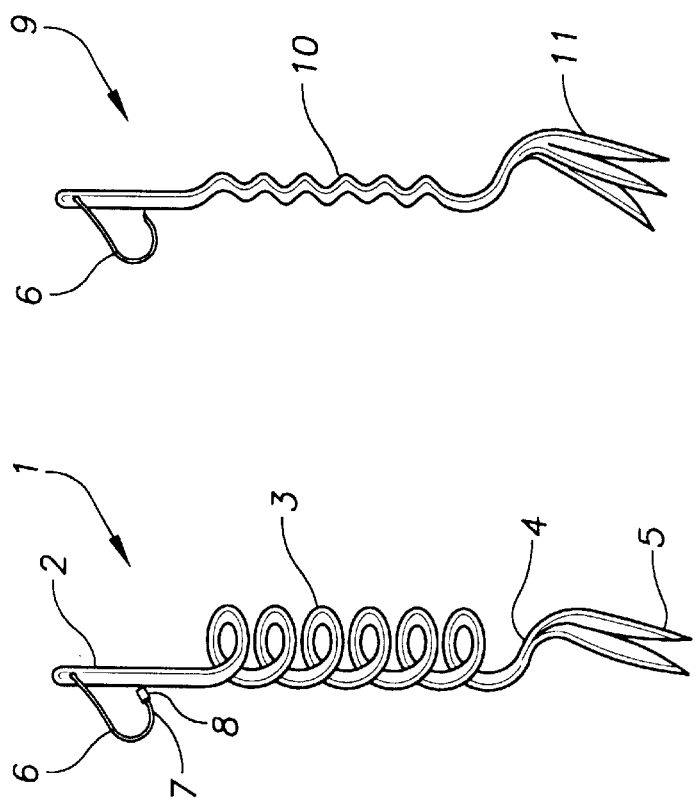

ANESTHETIC FISHING LURE

BACKGROUND OF THE INVENTION

The present invention relates to a fishing lure, and more specifically, a set of uniquely configured worm-like fishing lures specifically designed to attract and irritate a fish each having an anesthetic applicator removably attached to the hook for deadening the fish's mouth.

DESCRIPTION OF THE PRIOR ART

Various fishing lures designed to resemble worms, minnows, eels and similar fish bait species exist in the prior art. Some of these relate to an artificial worm constructed with a soft plastic or rubber material having a hook inserted therein. The typical artificial worm includes an elongated, flexible body portion that flutters but maintains a substantially linear configuration when pulled through the water. The linear motion of conventional artificial worms is typically less noticeable and therefore less enticing to a fish than certain spinning baits and other dynamic lures. The nature and degree of motion is critical since many fish species, such as a large mouth bass, strike when irritated. The level or irritation is often directly proportional to the movement and visibility of the bait. Brightly colored spinning baits have been developed to attract and aggravate a fish, however, their use and effectiveness is limited.

In addition, a hook embedded in a conventional worm will penetrate the mouth of a fish causing immediate and severe pain. The pain often causes the fish to pull and jerk uncontrollably sometimes resulting in the fish tearing the hook from its mouth and escaping. Additionally, the fish will present more of a struggle making it more difficult to reel in. Finally, as the fisherman attempts to remove the hook, the fish will continue to flop uncontrollably posing a danger to the fisherman since many have razor sharp gills and fins.

Various fishing lures having enhanced fish attracting qualities exist in the prior art. For example, U.S. Pat. No. 5,333,405 issued to Bowles relates to a plastic fishing lure having a particulate, microencapsulated fish attractant thereon.

U.S. Pat. No. 4,953,319 issued to Kasper et al relates to a fish bait having a dynamic tail with various attractants embodied therein. The attractants embodied in the bait relate to noise, light, taste, smell and color. The tail is long, flat and curved which undulates when drawn through the water to emit the attractant.

U.S. Pat. No. 5,068,993 issued to Millar relates to a method and apparatus for anesthetizing a fish by spraying an anesthetizing solution, preferably an alcohol/water solution, onto the gills or mouth of the fish.

U.S. Pat. No. 5,625,975 issued to Imes discloses a fishing lure having interchangeable flexible appendages whereby the performance of the lure is enhanced.

U.S. Pat. No. 5,517,781 issued to Paoletta, Jr. relates to a worm lure having a body with a center fluid reservoir for storing and dispensing a scented fluid.

U.S. Pat. No. 5,465,523 issued to Garst discloses a rigid, single tail fishing lure designed to resemble an eel or a snake. The lure has an elongated head portion, a U-shaped body portion and an enlarged tail portion whereby the lure undulates in the water.

The present invention provides a fishing lure having unique body and tail portions that cause the worm to extend and retract in a tantalizing and aggravating manner when pulled through the water. Furthermore, each lure has a hook with a cap removably attached to its shanked tip having an anesthetic gel therein for anesthetizing the mouth of the fish when it engages the hook.

SUMMARY OF THE INVENTION

The present invention relates to a new and improved fishing lure comprising an elongated head portion, a spiraled, a sinuous, a branched or alternatively a jagged body portion and a tail portion. The tail portion preferably includes a plurality of brightly colored tail members so as to be conspicuous to a nearby fish. Extending from the head portion is a hook member for penetrating the mouth of a fish. Removably attached to an end of the hook member is a cap having an anesthetic gel or similar substance therein. The spiraled and sinuous versions intervally extend and retract when pulled through the water whereas the jagged and branched versions flutter. It is therefore an object of the present invention to provide a fishing lure capable of instantly anesthetizing the mouth of a fish upon contact therewith.

It is yet another object of the present invention to provide a fishing lure uniquely configured to attract or aggravate a fish when pulled through the water.

It is yet another object of the present invention to provide a fishing lure having a uniquely configured tail portion that is more visible and conspicuous to a nearby fish than conventional lure tail portions. Other objects, features and advantages of the present invention will become readily apparent from the following detailed description of the preferred embodiment when considered with the attached drawings and the appended claims.

BRIEF DESCRIPTION OF THE DRAWINGS

FIG. 1 depicts a first embodiment of the present invention.

FIG. 2 depicts a second embodiment of the present invention.

FIG. 3 depicts a third embodiment of the present invention.

FIG. 4 depicts a fourth embodiment of the present invention.

DESCRIPTION OF THE PREFERRED EMBODIMENT

Referring now to FIG. 1, a first embodiment according to the present invention is depicted. The device relates to a fishing lure and includes an elongated flexible worm-like member 1 having an elongated head portion 2, a spiraled body portion 3 extending therefrom with a tail portion 4 at an opposite end thereof. The tail portion is preferably arcuate. Extending from the tail portion 4 are a plurality of tail members 5 which are brightly colored to create a more visually enticing lure that is irresistible to a nearby fish. In the preferred embodiment, two tail members are provided. The lure has a predetermined resilience such that, when the lure is pulled through the water by reeling the fishing line or by jerking the rod, the spiraled body portion will extend to a substantially linear configuration. When tension on the rod or fishing line diminishes or the lure otherwise achieves its maximum resilience or extension, the lure assumes its original spiraled configuration. Accordingly, the lure will intervally straighten and recoil in a spring like fashion.

Extending from the tip of the head portion is a J-shaped hook member 6 of the type generally known in the prior art relating to fish hooks. A distal end 7 of the J-shaped hook member is shanked for irreversibly penetrating a fish's mouth when the fish strikes or swallows the lure. The shanked end is normally inserted into the fishing lure body to conceal the hook until a fish strikes the lure. Removably attached to the pointed tip of the hook is a small rubber cap member 8 filled with an anesthetic solution, preferably in the form of a gel. The cap member 8 is preferably secured to the shanked end until the lure is used. When the cap member 8 is removed, a small amount of the gelatinous material will remain on the shank. Accordingly, when a fish strikes the bait, the hook will penetrate its mouth while simultaneously deadening the surrounding area.

FIG. 2 depicts a second embodiment of the present invention 9 in which the body portion has a jagged 10 configuration with preferably three tail members 11 on the tail portion. This embodiment will simulate a worm when in a dynamic mode. Again, the brightly colored three part tail will be more conspicuous and dynamic than conventional worm type lures.

FIG. 3 depicts a third embodiment 12 of the present invention in which the body portion 13 is sinuous. The lure 12 is likewise constructed with a predetermined resiliency such that when the fishing rod is jerked, the body portion will extend to a substantially linear configuration and will assume its original configuration shortly thereafter. As with the second embodiment, three tail members 14 are preferably provided. The interval extension and sudden retraction in combination with the conspicuous tail members provide a tantalizing motion that is irresistible to a fish proximal thereto.

A fourth embodiment 15 is depicted in FIG. 4 and comprises a linear, elongated body portion 16 having a plurality of longitudinally juxtaposed branch members 17 obliquely extending from opposing portions thereof. The fourth embodiment is designed to flutter as it is being pulled in the water. Each of the above described embodiments has an anesthetic filled cap removably attached to the hook shank as described above.

Each fishing lure according to the present invention is preferably made from plastic, silicone rubber or a combination thereof. However, as will be readily apparent to those skilled in the art, many other suitable flexible but resilient materials may be used. The anesthetic solution within the cap member is preferably a benzocaine gel material or any other similar equivalent.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A flexible but resilient fishing lure comprising:
   an elongated head portion;
   a spiral shaped body portion extending from said head portion, said body portion having a predetermined resilience such that the body portion intervally extends and retracts when pulled through a body of water;
   a plurality of tail members extending from said body portion; a solid J-shaped hook member extending from said head portion having a shanked terminal end for selectively penetrating the head portion of the lure and the mouth of a fish;
   a cap member removably attached to the shanked terminal end of said hook, said cap member having an anesthetic material therein.

2. A fishing lure according to claim 1 wherein said anesthetic material includes a benzocaine gel.

3. A flexible but resilient fishing lure comprising:
   an elongated head portion; a flexible body portion having a tortuous configuration, said body extending from said head portion having a predetermined resiliency whereby the body portion extends to a substantially linear configuration when said lure is dynamic and reverts to its original configuration when said lure is static; a solid J-shaped hook member extending from said head portion having a shanked terminal end for penetrating the head portion of the lure and the mouth of a fish; and a cap member removably attached to the shanked terminal end of the hook member said cap member having an anesthetic material therein.

4. A fishing lure according to claim 3 wherein said body portion is jagged.

5. A fishing lure according to claim 3 wherein said body portion is sinuous.

6. A fishing lure according to claim 3 wherein said anesthetic material includes a benzocaine gel.

7. An artificial worm-like lure comprising:
   an elongated, substantially linear body portion having first and second ends; a plurality of branch members obliquely extending from opposing sides of said body portion, said body portion and said branch members constructed with a flexible but resilient material whereby said lure flutters in a dynamic state; a solid J-shaped hook member extending from a first end of said body portion having a shanked terminal end for penetrating the lure and the mouth of a fish; and a cap member removably attached to the shanked end of said hook having an anesthetic material therein.

8. A fishing lure according to claim 7 wherein said anesthetic material includes a benzocaine gel.

* * * * *